United States Patent [19]

Boutni et al.

[11] Patent Number: 4,626,572
[45] Date of Patent: Dec. 2, 1986

[54] RESINOUS COMPOSITION

[75] Inventors: Omar M. Boutni, Mt. Vernon, Ind.; Ping Y. Liu, Naperville, Ill.

[73] Assignee: General Electric Company, Mt. Vernon, Ind.

[21] Appl. No.: 812,289

[22] Filed: Dec. 23, 1985

[51] Int. Cl.$^4$ .............................................. C08L 69/00
[52] U.S. Cl. .................................... 525/67; 524/508; 525/146; 525/147
[58] Field of Search ................... 525/67, 146, 87, 147, 525/439; 524/508

[56] References Cited

U.S. PATENT DOCUMENTS 4,419,491 12/1983 Sakano et al. ....................... 525/67
4,559,388 12/1985 Liu et al. .............................. 525/146

Primary Examiner—Theodore E. Pertilla
Attorney, Agent, or Firm—Myron B. Kapustij; Martin B. Barancik

[57] ABSTRACT

A resinous composition exhibiting improved thick section impact strength and improved resistance to organic solvents comprising, in physical admixture:
(i) a blend containing at least one aromatic carbonate resin and at least one grafted derivative of an ethylene-propylene-diene terpolymer; and
(ii) an amount effective to improve the thick section impact strength and resistance to organic solvents of said blend of at least one ethylene-propylene-diene terpolymer.

30 Claims, No Drawings

RESINOUS COMPOSITION

BACKGROUND OF THE INVENTION

The present invention relates to compositions containing blends of resins. More particularly it relates to blends of aromatic polycarbonate resins and graft derivatives of ethylene-propylene-diene terpolymers which contain an amount of an ethylene-propylene-diene terpolymer effective to positively upgrade the impact properties, particularly the thick section impact properties, and the resistance to environmental stress crazing and cracking of said blends.

The polycarbonates are well known commercially available materials which, due to their many advantageous properties, find use as thermoplastic engineering materials. The polycarbonates exhibit, for example, excellent properties of toughness and heat resistance.

However, the polycarbonates suffer from two disadvantages. The first disadvantage is the low critical thckness values of polycarbonates, i.e., the thickness at which a discontinuity in Izod impact values occurs. These low critical thickness values tend to limit wall thickness of molded polycarbonate articles to a thickness below the critical thickness. Polycarbonates exhibit notched Izod impact values which are dependent upon the thickness of the polycarbonate articles. Thus, for example, while typical notched Izod impact values of 3.2 mm thick polycarbonate test specimens are generally in the range of about 87 kgf-cm/cm, typical notched Izod impact values for 6.4 mm thick test specimens are generally in the range of about 11 kgf-cm/cm. The relatively high notched Izod values for the 3.2 mm thick polycarbonate test specimens are due to the fact that these specimens are thinner than the critical thickness of the polymer and, therefore, upon impact a hinged or ductile break occurs. The low notched Izod impact values of the 6.4 mm thick polycarbonate test specimens are due to the fact that these specimens exceed the critical thickness of the polymer and, therefore, upon impact a clean or brittle type break occurs.

The second disadvantage of polycarbonates is their susceptibility to environmental stress crazing and cracking. Environmental stress crazing and cracking refer to the type of failure which is hastened by the presence of organic solvents such as, for example, gasoline, acetone, heptane and carbon tetrachloride when such solvents are in contact with stressed parts fabricated from aromatic polycarbonate resins. The most significant effect is a loss in impact strength, particularly thick section impact strength, and an increase in brittle type failure.

Polycarbonate resins have been blended with other thermoplastic materials such as high molecular weight polymeric glycol esters of terephthalic and/or isophthalic acid; acrylonitrile-butadiene-styrene terpolymers, i.e., the ABS resins; and the like. Mixtures of polycarbonate resins with ABS graft copolymers are disclosed to have improved impact properties in U.S. Pat. No. 4,172,103. However, it is disclosed in U.S. Pat. Nos. 3,130,177 and 3,825,393 that impact resistance of polycarbonate resins tends to be lowered when it is blended with ABS resins.

The blending art, particularly when dealing with polycarbonates, is thus a generally complex and somewhat unpredictable area where the empirical approach is still generally the rule rather than the exception. Thus, in order to provide a useful binary blend of a polycarbonate resin with other resins the two resins must be compatible, they must be combinable over certain useful concentrations, and the blend should exhibit a combination of the various advantageous properties of the resins rather than the individual properties of the neat resins. The formulation of blends containing three or more different resins is fraught with a much higher degree of complexity and unpredicatbility.

Grafted derivatives of ethylene-propylenediene terpolymers and compositions of such polymers with other resins are known in the art and are described in the patent literature. It has been disclosed, for example, that olefinic copolymers and terpolymers can be grafted with styrene, acrylo-nitrile-styrene, methyl methacrylate, styrene-methyl methacrylate, and the like, to provide thermoplastics which can be further blended, e.g., with styrene-acrylonitrile, and molded, extruded or vacuum formed into articles having good tensile and impact strengths.

Polymers of this type and methods for their preparation are described in U.S. Pat. Nos. 4,202,948 and 4,166,081, the former being incorporated by reference. Thermoplastic resin blends of polysulfone resins and graft derivatives of ethylene-propylene-diene terpolymers are disclosed in U.S. Pat. No. 3,641,207 to have good processability and impact resistance over relatively narrow concentration ranges.

Aromatic polycarbonate resins and grafted derivatives of ethylene-propylene-diene terpolymers are combinable with each other over a wide range of concentrations and provide compositions which exhibit advantageous properties after molding. Such properties are obtained over a wide range of compositions. Especially noteworthy properties are high gloss on the surface of articles molded from these compositions and improved resistance to environmental stress crazing and cracking as compared with aromatic polycarbonate resins.

While these blends of polycarbonate resin and graft derivatives of ethylene-propylene-diene terpolymers are useful in a wide variety of applications there are certain applications which require greater impact strength, particularly greater thick section impact strength, and better resistance to environmental stress crazing and cracking, particularly at thick sections, than possessed by these blends. It is, therefore, an object of the instant invention to provide polycarbonate/graft derivatives of ethylene-propylene-diene terpolymer blends which possess improved impact properties, particularly at thick sections, and improved resistance to environmental stress crazing and cracking, particularly at thick sections.

SUMMARY OF THE INVENTION

The instant invention is directed to a resinous composition exhibiting improved impact properties, particularly at thick sections, and improved resistance to environmental stress crazing and cracking, particularly at thick sections, comprised of:

(i) a blend of an aromatic carbonate resin and a graft derivative of ethylene-propylene-diene terpolymer and;

(ii) an amount effective to improve the impact properties and resistance to enironmental stress crazing and cracking, particularly at thick sections, of said blend of an ethylene-propylene-diene terpolymer.

DESCRIPTION OF THE INVENTION

It has been discovered that compositions of polycarbonates and grafted derivatives of ethylene-proplyene-diene terpolymers can be provided which exhibit improved impact properties, particularly at thick sections, and improved resistance to environmental stress crazing and cracking, particularly at thick sections, relative to the binary blends of polycarbonate resins/grafted derivatives of ethylene-propylene-diene terpolymers.

According to the present invention there are provided compositions exhibiting improved impact properties, particularly at thick sections, and improved resistance to environmental stress crazing and cracking, particularly at thick sections, comprised of, in admixture:

(i) a blend of at least one aromatic polycarbonate resin and at least one grafted derivative of ethylene-propylene-diene terpolymer; and (ii) an amount at least effective to improve the impact properties, particularly at thick sections, and resistance to environmental stress crazing and cracking of said blend of at least one ethylene-propylene-diene terpolymer.

The high molecular weight aromatic polycarbonate resins utilized in the blends (i) are well known in the art and are amply described in the patent literature. Many of these polycarbonate resins are commercially available. These polycarbonates, along with methods for their preparation, are described in U.S. Pat. Nos. 3,161,615, 3,220,973, 3,312,660, 3,312,659, 3,313,777, 3,666,614 and 3,939,672, all of which are inorporated by reference.

These polycarbonates contain at least the following recurring structural unit:

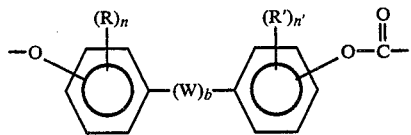

wherein:
R and R' are independently selected from monovalent hydrocarbon radicals, monovalent hydrocarbonoxy radicals, and halogen radicals;
W is selected from divalent hydrocarbon radicals,

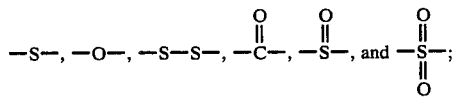

n and n' are independently selected from integers having a value of from 0 to 4 inclusive; and
b is either zero or one.

The monovalent hydrocarbon radicals represented by R and R' include the alkyl, cycloalkyl, aryl, aralkyl, and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl and biphenyl. The preferred aralkyl and alkaryl radicals are those containing from 7 to about 14 carbon atoms.

The monovalent hydrocarbonoxy radicals represented by R and R' may be represented by the general formula—$OR^1$ wherein $R^1$ is a monovalent hydrocarbon radical of the type described hereinafore. Preferred hydrocarbonoxy radicals are the alkoxy and aryloxy radicals.

The preferred halogen radicals represented by R and R' are chlorine and bromine.

The divalent hydrocarbon radicals represented by W include the alkylene radicals, the alkylidene radicals, the cycloalkylene radicals, and the cycloalkylidene radicals. Preferred alkylene radicals are those containing from 2 to about 30 carbon atoms. Preferred alkylidene radicals are those containing from 1 to about 30 carbon atoms. Preferred cycloalkylene and cycloalkylidene radicals are those containing from 6 to about 16 ring carbon atoms.

These polycarbonates may be conveniently prepared by the reaction of a dihydric phenol with a carbonate precursor. Typically, the dihydric phenols used may be represented by the formula

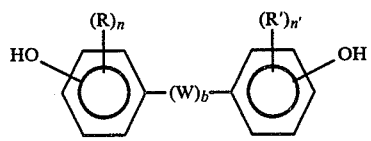

wherein R, R', W, n, n' and b are as defined hereinafore.

Some illustrative non-limiting examples of these dihydric phenols include:
2,2-bis(4-hydroxyphenyl)propane (bisphenol-A);
bis(4-hydroxyphenyl)methane;
2,2-bis(3,5-dimethyl-4-hydroxyphenyl)propane;
2,2-bis(3,5-dibromo-4-hydroxyphenyl)propane;
1,1-bis(4-hydroxyphenyl)decane;
1,1-bis(4-hydroxyphenyl)cyclohexane;
1,1-bis(3,5-dimethyl-4-hydroxyphenyl)cyclohexane;
1,1-bis(4-hydroxyphenyl)cyclododecane;
4,4'-thiodiphenol; and
bis(4-hydroxyphenyl)ether.

Other dihydric phenols are also available and are disclosed, inter alia, in U.S. Pat. Nos. 2,999,835, 3,028,365 and 3,334,154, all of which are incorporated herein by reference.

It is, of course, possible to employ a mixture of two or more different dihydric phenols as well as individual dihydric phenols in the preparation of the instant polycarbonates.

Preferred polycarbonates of Formula I are the para, para-polycarbonates, i.e., polycarbonates containing at least the following recurring structural unit:

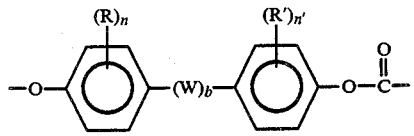

wherein R, R', W, n, n' and b are as defined hereinafter. Particularly useful polycarbonates of this type are those wherein b is one and W is selected from divalent hydrocarbon radicals of the type described hereinafore.

The carbonate precursor employed may be a carbonyl halide, a carbonate ester, or a bishaloformate. The carbonyl halides are carbonyl bromide, carbonyl chloride, and mixtures thereof. Typical of the carbonate esters are diphenyl carbonate; di(halophenyl) carbonates such as di(chlorophenyl)carbonate and di(bromophenyl)carbonate; di(alkylphenyl)carbonates such as di(tolyl)carbonate; and di(naphthyl)carbonate.

The bishaloformates include the bishaloformates of dihydric phenols such as bisphenol-A and hydroquinone; bishaloformates of glycols such as ethylene glycol, neopentyl glycol, and polyethylene glycol; and the like.

These polycarbonates may be prepared by well known conventional processes such as the interfacial polymerization process, transesterification, and melt polymerization. Some of these processes are described, inter alia, in U.S. Pat. Nos. 4,018,750, 4,123,436 and 3,153,008, all of which are incorporated by reference.

Included within the scope of the term polycarbonates are the randomly branched aromatic thermoplastic polycarbonates. These randomly branched polycarbonates may be conveniently prepared by the coreaction of a dihydric phenol, a carbonate precursor, and a minor amount of a branching agent. The branching agents are well known in the art and are generally polyfunctional aromatic compounds which contain at least three functional groups which may be hydroxyl, carboxyl, carboxylic anhydride, haloformyl, or mixtures thereof. Some of these polyfunctional aromatic compounds are disclosed in U.S. Pat. Nos. 3,525,712, 3,541,049, 3,544,514, 3,635,895, 3,816,373, 4,001,184, 4,202,047 and 4,194,953, all of which are incorporated herein by reference.

Also included within the scope of the instant invention are the copolyester-carbonates. These copolyester-carbonates, as well as methods for their preparation, are well known in the art and are described, inter alia, in U.S. Pat. No. 3,169,121, which is incorporated herein by reference. The copolyester-carbonates contain recurring carbonate groups, carboxylate groups, and aromatic carbocyclic groups in the linear polymer chain in which at least some of the carbonate groups and at least some of the carboxylate groups are bonded directly to the ring carbon atoms of the aromatic carbocyclic groups.

These copolyester-carbonates contain ester bonds and carbonate bonds in the polymer chain, wherein the amount of ester bonds is in the range of from about 25 to about 90 mole percent, preferably from about 35 to about 80 mole percent. Thus, for example, 5 moles of bisphenol-A reacting completely with 4 moles of isophthaloyl dichloride and one mole of phosgene would give a copolyester-carbonate containing 80 mole percent ester bonds.

The copolyester-carbonates of the instant invention may be conveniently prepared by the reaction of at least one dihydric phenol, a carbonate precursor, and at least one ester precursor. The ester precursor may be, without limitation, a difunctional carboxylic acid, preferably an aromatic difunctional carboxylic acid, or an ester forming reactive derivative thereof. Some useful difunctional aromatic carboxylic acids include isophthalic acid, terephthalic acid, and mixtures thereof. Instead of using the difunctional carboxylic acids it is preferred to utilize their ester forming reactive derivatives such as, for example, the acid dihalides. Thus, for example, instead of using isophthalic acid, terephthalic acid, or mixtures thereof it is preferred to employ isophthaloyl dichloride, terephthaloyl dichloride, and mixtures thereof.

The grafted derivatives of ethylene-propylenediene terpolymers which form the second component of the blends (i) are well known in the art and are generally commercially available, e.g., under the trade designation ROVEL ® from Uniroyal Inc., or may be readily prepared by known methods. These resins may be characterized as an ethylene-propylene-non-conjugated diene interpolymer grafted with the homopolymer or copolymer of monoethylenically unsaturated monomers as disclosed in U.S. Pat. No. 4,202,948, for example, styrene, styrene-acrylonitrile, methyl methacrylate or styrene-methyl methacrylate, halostyrenes, alpha methylstyrene, p-methylstyrene acrylonitrile, methacrylonitrile, acrylic acid, methacrylic acid, the lower alkyl esters of acrylic acid and methacrylic acid, styrene maleic anhydride, and the like.

More particularly, the second component of the blends (i) is a resinous composition of (A) polymerized alkenyl aromatic units and/or (B) polymerized acrylic units, in combination with (C) a rubbery terpolymer comprising copolymerized units of ethylene and propylene and a non-conjugated diolefin. Preferably this second component of (i) is a graft copolymer produced by polymerizing the resin forming alkenyl aromatic monomer and the acrylic monomer in the presence of a rubbery terpolymer of ethylene, propylene and a non-conjugated diolefin.

The non-conjugated dienes used in the preparation of the terpolymer elastomers may include open chain non-conjugated dienes such as 1,4-hexadiene and also cyclic (especially bridged ring) non-conjugated dienes such as dicyclopentadiene, 5-methylene-2-norbornene, 5-ethylidene-2-norbornene, and 1,4-cyclooctadiene. The respective weight ratios of ethylene to propylene in the elastomers may range from 40:60 to 75:25. The content of the additional monomer, such as the non-conjugated diene, in the terpolymer can range from about 1% to about 20% by weight. The preferred diene is 5-ethylidene-2-norbornene.

Methods for the preparation of the forgoing rubbery terpolymers are described in U.S. Pat. Nos. 2,933,480, 3,000,866 and 3,000,867.

The resin forming monomers useful for copolymerization with the aforedescribed rubbery copolymers and terpolymers include styrene, alpha-methylstyrene, p-methylstyrene and other alkyl ring substituted styrenes and acrylics such as as acrylonitrile, acrylates and alkacrylates. The ester portion of the acrylate is generally alkyl from one to about 8 carbon atoms, inclusive, preferably from one to about 6 carbon atoms, inclusive. The "alk" portion of the "alkacrylate" is alkyl of one to three carbon atoms, inclusive. Examples of acrylate and alkacrylate include ethyl acrylate, n-butyl acrylate, 2-ethylhexylacrylate, methylmethacrylate, propylethylacrylate and isopentylpropacrylate. Mixtures of styrenics and acrylates can also be employed. Especially preferred are mixtures of styrene and acrylonitrile.

As explained hereinafore the graft copolymers are prepared by polymerizing the resin forming monomers, e.g., styrene and acrylonitrile, in the presence of rubbery terpolymer, e.g., ethylene-propylene-diene. In one procedure the rubbery terpolymer is dissolved in an inert organic solvent, e.g., benzene, to form a cement, to which is added the desired amount of the resin forming monomers and a radical initiator, e.g., peroxide. The mixture is heated to decompose the initiator and to polymerize the monomers. The graft copolymer which results is isolated, e.g., by precipitation with an anti-solvent such as methanol.

The evidence indicates that at least a portion of the resins grafts onto the rubber to form a graft copolymer made up of a rubbery spine or backbone polymer and resinous side chains.

The proportion of resin forming monomers to rubber used in the graft polymerization can vary, for instance, from 1:4 to 4:1, on a weight basis.

The graft copolymers and methods of their preparation are described in greater detail by F. X. O'Shea in U.S. Pat. No. 3,642,950 and by Albert Fournier Jr. and Charles Paddock in U.S. Pat. No. 4,166,081, both of which are incorporated herein by reference.

Since the carbonate resins and the grafted derivatives of ethylene-propylene-diene terpolymers are compatible in widely varient proportions the blends (i) can contain wide ranges of these two resins, for example, from 5 to 95 parts by weight of the carbonate resin and from 95 to 5 parts by weight of said grafted derivative per 100 parts by weight of said carbonate resin and said grafted derivative combined, with the particular amount being dependent on specific requirements. A particularly useful ratio is from about 60 to about 95 parts by weight of carbonate resin and from about 5 to about 40 parts by weight of said grafted derivative of ethylene-propylene-diene terpolymer.

Component (ii) of the instant compositions is an ethylene-propylene-diene terpolymer. These ethylene-propylene-diene terpolymers are well known in the art and are generally commercially available, e.g., VISTALON 3708 from Exxon Corp., or may be readily prepared by known methods. More particularly, the ethylene-propylene-diene terpolymers (EPDM terpolymers) useful in the instant compositions are rubbery terpolymers comprising copolymerized units of ethylene and propylene and a non-conjugated diolefin.

The non-conjugated dienes used in the preparation of the terpolymer elastomers may include open chain non-conjugated dienes such as 1,4-hexadiene and also cyclic (especially bridged ring) non-conjugated dienes such as dicyclopentadiene, 5-methylene-2-norbornene, 5-ethylidene-2-norbornene, and 1,4-cyclooctadiene. The respective weight ratios of ethylene to propylene in the elastomers may range from 40:60 to 75:25. The content of the additional monomer, i.e., non-conjugated diene, in the terpolymer can range from about 1% to about 20% by weight. The preferred diene is 5-ethylidene-2-norbornene.

Methods for the preparation of these ethylene-propylene-diene terpolymers are described in U.S. Pat. Nos. 2,933,480, 3,000,866 and 3,000,867, all of which are incorporated herein by reference.

The amount of component (ii) present in the instant compositions is an amount which is at least effective to improve or positively upgrade the thick section impact properties, e.g., impact strength, and resistance to environmental stress crazing and cracking of blend (i). Generally this amount is from about 1 to about 25 weight percent, preferably from about 2 to about 20 weight percent, and more preferably from about 3 to about 15 weight percent. Weight percent of component (ii) in the instant compositions is measured as the amount of component (ii) based on the total of component (ii) and blend (i) present, i.e., the total amounts of ethylene-propylene-diene terpolymer, carbonate polymer, and graft derivative of ethylene-propylene-diene terpolymer present.

While the presence of component (ii) in the aforedescribed amounts is effective in improving the thick section impact properties and the resistance to environmental stress crazing and cracking of blend (i), varying the amounts of component (ii), within the aforedescribed concentrations, will have different effects upon the thin section impact properties of blend (i). Thus in amounts up to about 8 weight percent of component (ii) both the thick section and thin section impact properties of blend (i) are positively upgraded or improved and there is a significant improvement in the resistance to environmental stress crazing and cracking of blend (i) in thick sections. In amounts greater than about 8 weight percent of component (ii) there is an improvement or positive upgrading of the thick section impact properties of blend (i) as well as an improvement in the resistance to environmental stress crazing and cracking, in both thin and thick sections, of blend (i), but there is also a decrease in the impact strength of blend (i) in thin section.

Thus, one embodiment of the instant invention is a composition exhibiting improved thick section impact properties and an improvement in resistance to environmental stress crazing and cracking, particularly in thick sections, comprised of blend (i), and an amount of component (ii) effective to positively upgrade or improve the thick section impact properties and resistance to environmental stress crazing and cracking, particularly in thick sections, of blend (i). This amount of component (ii) is, as set forth hereinafore, generally from about 1 to about 25 weight percent, preferably from about 2 to about 20 weight percent, and more preferably from about 3 to about 15 weight percent.

A second embodiment of the instant invention is a composition exhibiting improved impact properties, in both thin and thick sections, and an improvement in resistance to environmental stress crazing and cracking, particularly in thick sections, comprised of blend (i), and an amount of component (ii) effective to positively upgrade or improve the impact properties, both in thin and thick sections, and the resistance to environmental stress crazing and cracking, particularly in thick sections, of said (i). This amount of component (ii) is generally from about 1 to about 8 weight percent, preferably from about 2 to about 7 weight percent.

A third embodiment of the instant invention is a composition exhibiting improved thick section impact properties, e.g., impact strength, and improved resistance to environmental stress crazing and cracking, in both thin and thick sections, comprised of blend (i), and an amount of component (ii) effective to improve the thick section impact properties and the resistance to environmental stress crazing and cracking, in both thin and thick sections, of blend (i). This amount is generally from greater than about 8 weight percent to about 25 weight percent, preferably from about 9 to about 20 weight percent.

Generally, if less than about 1 weight percent of component (ii) is present in the instant compositons there is no significant improvement in the impact properties, particularly thick section impact properties, or resistance to environmental stress crazing or cracking of blend (i). On the other hand, if the amount of component (ii) exceeds about 25 weight percent some of the advantageous properties and characteristics of blend (i) are substantially deleteriously affected.

It is generally preferred that the instant compositions contain no glass, such as for example glass fibers. It is further preferred that blend (i) contains either a polycarbonate resin or a copolyester-carbonate resin.

The compositions of the instant invention may be readily prepared by physically mixing or blending the various components, which have been preformed, together. Thus, for example, the instant compositions may be prepared by first formulating blend (i) by admixing together the carbonate resin with the graft derivative of ethylene-propylene-diene terpolymer, and then mixing this blend with the desired amount of component (ii). Alternately, a composition of the instant invention may be prepared by mixing together a carbonate resin, a graft derivative of ethylene-propylene-diene terpolymer, and an ethylene-propylene-diene terpolymer.

The compositions of the instant invention may be used to form molded, extruded or vacuum formed parts. These compositions are especially useful for the production of molded parts having glossy surfaces and improved resistance to organic solvents.

The compositions of the instant invention may optionally contain the various well known additives such as, for example, antioxidants; antistatic agents; mold release agents; hydrolytic stabilizers such as the epoxides; color stabilizers such as the organophosphites; colorants; ultraviolet radiation stabilizers such as the benzophenones and the benzotriazoles; and flame retardants.

The flame retardants which may be employed include the alkali and alkaline earth metal salts of organic sulfonic acids. These salts are described, inter alia, in U.S. Pat. Nos. 3,933,734, 3,948,851, 3,926,908, 3,919,167, 3,909,490, 3,953,397, 3,931,100, 3,978,024, 3,953,399, 3,917,599, 3,951,810, 3,940,366, 3,775,367 and 3,837,490, all of which are incorporated herein by reference.

Conventional well known flame retardants other than the aforedescribed salts may also be employed. These conventional flame retardant additives generally contain a halogen, preferably chlorine and/or bromine. That is to say, they are a halogen source. They may be inorganic or organic, preferably organic. Typical of the inorganic halogen sources are NaCl, KBr, KCl, etc. The organic halogen sources are preferably aromatic and may be either monomers or polymers. Typical aromatic monomers include the halodiphenyl ethers such as tetrabromodiphenyl ether, etc. Typical aromatic polymers include those derived from halogenated dihydric phenols such as, for example, a polycarbonate derived from tetrabromobisphenol-A or a carbonate copolymer derived from bisphenol-A and tetrabromobisphenol-A. The flame retardant additives are present in the instant compositions in flame retardant amounts, i.e., amounts effective to render said compositions flame retardant

DESCRIPTION OF THE PREFERRED EMBODIMENT

In order that those skilled in the art may better understand how the present invention may be practiced the following examples are given by way of illustration and not by way of limitation. In the examples all parts and percentages are parts and percentages by weight unless otherwise specified.

The following example illustrates a composition falling outside the scope of the instant invention. It is presented for comparative purposes only.

EXAMPLE 1

This example, which is the control, illustrates a blend of an aromatic polycarbonate resin and a graft copolymer of styrene-acrylonitrile on an ethylene-propylene-5-ethylidene-2-norbornene terpolymer.

A composition is prepared by tumble mixing 20 parts by weight of a graft copolymer of styrene-acrylonitrile on ethylene-propylene-5-ethylidene-2norbornene (ROVEL ® 401—Uniroyal, Inc.) with 80 parts by weight of an aromatic polycarbonate resin derived from bisphenol-A and phosgene in (LEXAN ® resin—General Electric Company). The resulting blend is extruded at 255° C. and injection molded at 260° C. into test specimens measuring 63.5 mm×12.7 mm×3.2 mm thick and 63.5 mm×12.7 mm×6.4 mm thick.

The Heat Deflection Temperature Under Load (HDTUL) at 18.6 kgf/cm$^2$ of these test specimens is determined in accordance with ASTM D648, and the results are set forth in Table I. Also determined is the notched Izod impact strength, in kgf-cm/cm in accordance with ASTM D256, and the results are set forth in Table I.

The following examples illustrate the compositions of the instant invention.

EXAMPLE 2

Test specimens are prepared substantially in accordance with the procedure of Example 1 except that a composition is prepared by mixing 85 parts by weight of the polycarbonate resin of Example 1, 10 parts by weight of the graft copolymer of Example 1, and 5 parts by weight of ethylene-propylene-5-ethylidene-2-norbornene terpolymer (VISTALON 3708—Exxon).

The Heat Deflection Temperature Under Load and the notched Izod impact strength of these test specimens are determined and the results are set forth in Table I.

EXAMPLE 3

Test specimens are prepared substantially in accordance with the procedure of Example 1 except that a composition is prepared by mixing 10 parts by weight of the graft copolymer of Example 1, 80 parts by weight of the polycarbonate resin of Example 1, and 10 parts by weight of the ethylene-propylene-5-ethylidene-2-norbornene terpolymer of Example 2.

The Heat Deflection Temperature Under Load and the notched Izod impact strength of these test specimens are determined and the results are set forth in Table I.

In addition some of the test specimens of Examples 1–3 are mounted on a stress jig (0.7% strain/ 141 kgf/cm$^2$ ) and are soaked at room temperature for two hours in AMOCO unleaded premium gasoline. The specimens are removed from the jig, the gasoline is allowed to evaporate at room temperature for 24 hours, and the specimens are then subjected to the notched Izod impact strength test. The results are set forth in Table I.

TABLE I

| Example No. | Notched Izod (kgf-cm/cm) before soaking in gasoline | | Notched Izod (kgf-cm/cm) after soaking in gasoline | | HDTUL (°C.) |
| --- | --- | --- | --- | --- | --- |
| | 3.2 mm | 6.4 mm | 3.2 mm | 6.4 mm | |
| 1 | 76 | 6.1 | 8.3 | broke | 122.2 |
| 2 | 81.1 | 58.8 | 8.2 | 23.9 | 125.3 |
| 3 | 59.3 | 31.0 | 34.9 | 20.1 | 124.8 |

As illustrated by the data in Table I the compositions of the instant invention exhibit better thick section Notched Izod impact strengths, both before and after soaking in gasoline. Furthermore, the composition of Example 2 exhibits both better thin section and thick section Notched Izod impact strength, before soaking in gasoline, and better thick section Notched Izod impact strength after soaking in gasoline than the control of Example 1. The composition of Example 3 exhibits better thick section Notched Izod impact strength before soaking in gasoline and better thin and thick section Notched Izod impact strengths after soaking in gasoline than the control of Example 1.

Furthermore, the compositions of the instant invention exhibit better thermal resistance, as indicated by their HDTULs, than the control of Example 1.

Obviously, other modifications and variations of the instant invention, as described above, are possible in light of the disclosure. It is to be understood, therefore, that changes may be made in the particular embodiments shown without departing from the scope of the invention defined in the appended claims.

What is claimed is:

1. A resin composition exhibiting improved thick section impact strength and improved resistance to organic solvents consisting essentially of, in admixture:
   (i) a blend consisting essentially of (a) at least one aromatic polycarbonate resin or at least one aromatic copolyester-carbonate resin and (b) at least one grafted derivative of an ethylene-propylene-diene terpolymer; and
   (ii) an amount effective to at least improve the thick section impact strength and resistance to organic solvents of said blend of at least one ethylene-propylene-diene terpolymer.

2. The composition of claim 1 wherein said amount of (ii) is from about 1 to about 25 weight percent, based on the total amounts of (i) and (ii) present.

3. The composition of claim 2 wherein said amount of (ii) is from about 2 to about 20 weight percent.

4. The composition of claim 3 wherein said amount of (ii) is from about 3 to about 15 weight percent.

5. The composition of claim 2 wherein said amount of (ii) is from about 1 to about 8 weight percent.

6. The composition of claim 5 wherein said amount of (ii) is from about 2 to about 7 weight percent.

7. The composition of claim 2 wherein said amount of (ii) is from above about 8 weight percent to about 25 weight percent.

8. The composition of claim 7 wherein said amount of (ii) is from about 9 to about 20 weight percent.

9. The composition of claim 1 wherein said blend consists essentially of an aromatic polycarbonate resin and a graft derivative of an ethylene-propylene diene terpolymer.

10. The composition of claim 9 wherein said polycarbonate resin contains at least one recurring structural unit represented by the general formula

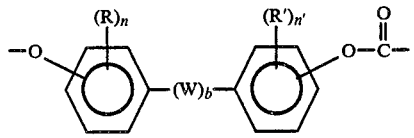

wherein
R and R' are independently selected from monovalent hydrocarbon radicals, monovalent hydrocarbonoxy radicals, or halogen radicals,
W is selected from divalent hydrocarbon radicals,

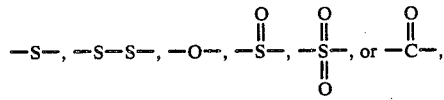

b is either zero or one, and
n and n' are independently selected from integers having a value of from 0 to 4 inclusive.

11. The composition of claim 10 wherein b is one.

12. The composition of claim 11 wherein W is selected from divalent hydrocarbon radicals.

13. The composition of claim 1 wherein said grafted derivative of said ethylene-propylene-diene terpolymer is an ethylene-propylene-non-conjugated diene interpolymer grafted with a homopolymer or copolymer of monethylenically unsaturated monomers having a phenyl, carbonyl or cyano group attached to a vinylic carbon atom.

14. The composition of claim 13 wherein said grafted derivative is a graft polymer of styrene-acrylonitrile on an ethylene-propylene-non-conjugated diene terpolymer.

15. The composition of claim 14 wherein said ethylene-propylene-non-conjugated diene terpolymer is ethylene-propylene-5-ethylidene-2-norbornene.

16. The composition of claim 1 wherein said terpolymer of (ii) is ethylene-propylene-5-ethylidene-2-norbornene.

17. The composition of claim 16 wherein said grafted derivative is a graft polymer of styrene-acrylonitrile on an ethylene-propylene-5-ethylidene-2-norbornene terpolymer.

18. The composition of claim 17 wherein said aromatic carbonate is an aromatic polycarbonate resin.

19. The composition of claim 18 wherein said polycarbonate resin contains the reaction products of bisphenol-A and phosgene.

20. The composition of claim 1 which further contains a flame retardant amount of at least one flame retardant.

21. The composition of claim 1 wherein said blend consists essentially of an aromatic copolyester-carbonate resin and a graft derivative of an ethylene-propylene diene terpolymer.

22. The composition of claim 21 wherein said copolyester-carbonate resin contains from about 25 to about 90 mole percent ester bond.

23. The composition of claim 22 wherein said copolyester-carbonate resin contains the reaction products of at least one dihydric phenol, a carbonate precursor, and at least one ester precursor.

24. The composition of claim 23 wherein said ester precursor is selected from difunctional aromatic carboxylic acids or their ester forming reactive derivatives.

25. The composition of claim 24 wherein said ester precursor is selected from isophthalic acid, terephthalic acid, or mixtures thereof, or their ester forming reactive derivatives.

26. The composition of claim 25 wherein said carbonate precursor is selected from isophthaloyl dichloride, terephthaloyl dichloride, or mixtures thereof.

27. The composition of claim 1 wherein said grafted derivative of said ethylene-propylene-diene terpolymer is an ethylene-propylene-non-conjugated diene terpolymer grafted with a homopolymer or copolymer of monoethylenically unsaturated monomers having a phenyl, carbonyl or cyano group attached to a vinylic carbon.

28. The composition of claim 27 wherein said grafted derivative is a graft copolymer of styrene-acrylonitrile on an ethylene-propylene-non-conjugated diene terpolymer.

29. The composition of claim 28 wherein said ethylene-propylene-non-conjugated diene terpolymer is ethylene-propylene-5-ethylidene-2-norbornene.

30. The composition of claim 29 wherein said ethylene-propylene-diene terpolymer of (ii) is ethylene-propylene-5-ethylidene-2-norbornene.

* * * * *